United States Patent [19]
Ferriera

[11] 4,154,224
[45] May 15, 1979

[54] SOLAR STEAM GENERATOR

[76] Inventor: Cress R. Ferriera, 713 Paloma Ave., Stockton, Calif. 95210

[21] Appl. No.: 779,135

[22] Filed: Mar. 18, 1977

[51] Int. Cl.² ............................................. F24J 3/02
[52] U.S. Cl. ................................................. 126/271
[58] Field of Search .............................. 126/270, 271

[56] References Cited

U.S. PATENT DOCUMENTS

| | | | |
|---|---|---|---|
| 3,254,643 | 6/1966 | Thomason | 126/271 |
| 3,943,911 | 3/1976 | Yu | 126/271 |
| 3,965,887 | 6/1976 | Gramer et al. | 126/271 |
| 3,991,742 | 11/1976 | Gerber | 126/271 |
| 3,995,804 | 12/1976 | Folds et al. | 126/271 |
| 4,008,708 | 2/1977 | Hagarty | 126/271 |
| 4,023,556 | 5/1977 | Sarazin et al. | 126/271 |
| 4,056,092 | 11/1977 | Meier et al. | 126/271 |

Primary Examiner—Carroll B. Dority, Jr.
Attorney, Agent, or Firm—Mark C. Jacobs

[57] ABSTRACT

The present invention is an improvement in variable vacuum steam heating systems and subatmospheric steam heating systems consisting of a solar energy collecting panel capable of performing as full or part time substitute for the conventional steam boilers of vacuum steam heating systems. Essentially, the collector is two semi rigid air tight panels laminated together to provide a thin air tight chamber between their inner surfaces in which condensate being returned to the collector from the usual steam radiators, convectors, blast coils, and other heating devices is changed into steam at temperatures up to 212° F. under subatmospheric pressures by solar radiation. The collector panel is intended for roof or pad mounting in a semi-upright position and being piped into certain vacuum steam heating systems in a manner which allows the collector to remain in stand by or to work in parallel with the conventional boiler as a steam producer or to perform as full substitute for the conventional steam boiler automatically in accordance with prevailing weather conditions and the availability of solar radiation.

8 Claims, 7 Drawing Figures

SOLAR STEAM GENERATOR

Devices for collecting solar radiation and converting it into various energy forms are receiving considerably attention because of the increasing shortage of fossil fuels. The most obvious detriment to the popularity of solar heating systems is the higher cost of manufacturing and maintaining them compared to the lower cost of producing and burning fossil fuels. The primary object of the present invention is to make the production of heat from solar energy economically competitive with heat from fossil fuels.

Many alternatives to fossil fuel consumption for comfort heating of single and multiple family dwellings are unacceptable because they deviate too far from established architectural trends. Another objective of the present invention is to provide a means of collecting solar energy which is compatible with modern architecture, and fully adaptable as a retrofit for existing heating systems.

A further object of this invention is a solar panel construction versatile and simple enough to be completely fabricated on building sites as an alternative to conventional or built up roofing. The simplicity of the assembly should also facilitate factory manufacturing of panels to be used for replacement or modification of new or existing structure siding.

Other objects of this improvement will become apparent in the specification that follows. While the description relates to a single collector panel, additional panels may be assembled together in battery form for the purpose of increasing the total steam output of any given installation. Specific dimensions or other inferences regarding size and shape of the collector panels is primarily for the purpose of demonstration. In practice panels may be rectangular, oblong, circular, triangular, or irregular shaped. The claim for novelty is more to the sequence of the laminations through the cross-section of any given panel than to the overall size and shape.

Figure 1:
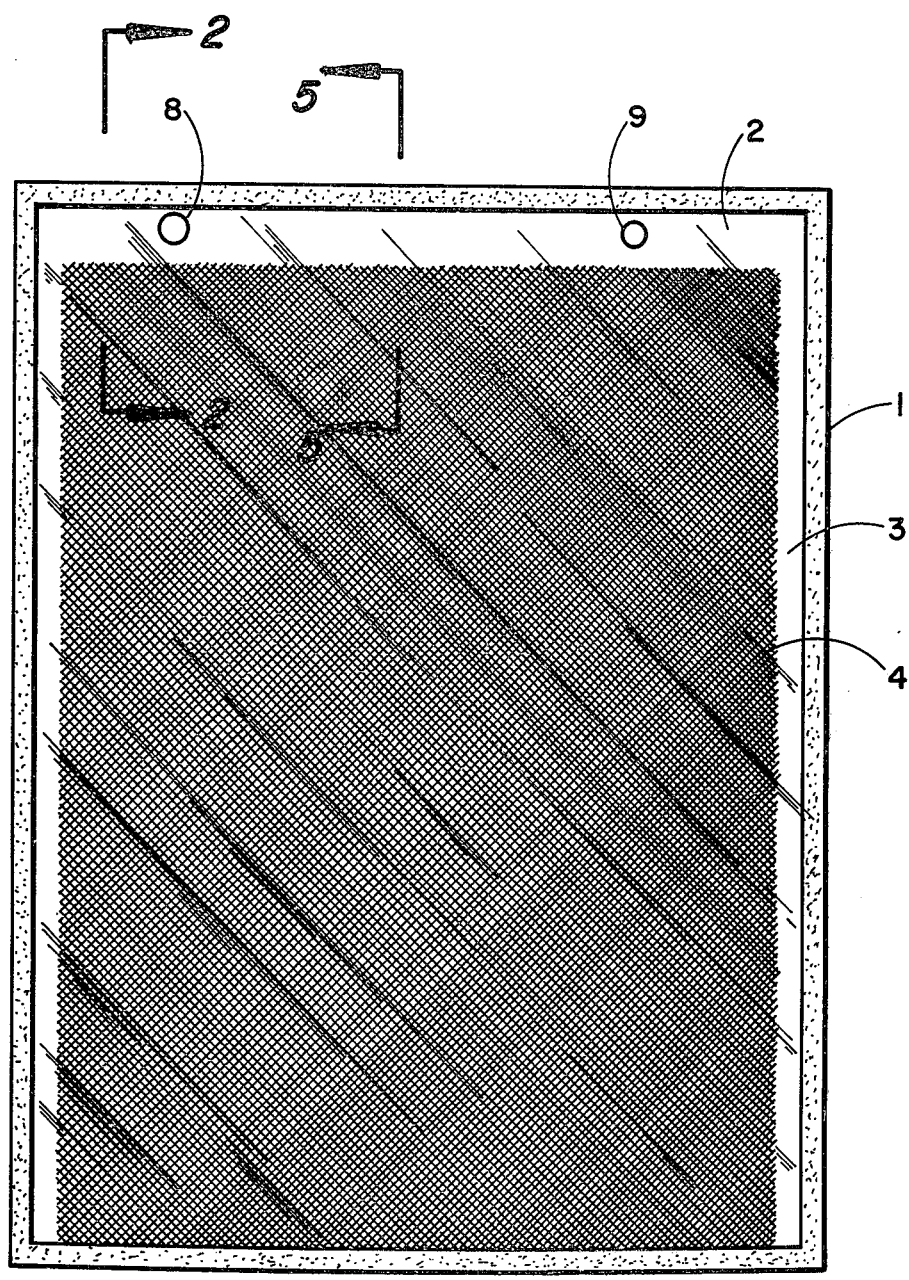
FIG. 1 is an elevational view of one embodiment of the invention, as seen from the solar facing side.
Figure 2:
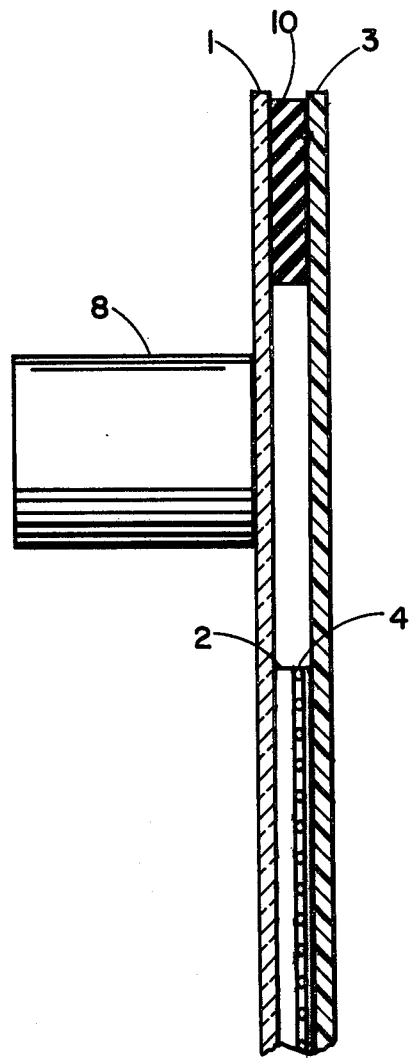
FIG. 2 is a partial cross-section taken on the lines 2—2 of the embodiment of FIG. 1.

The device 100 being claimed is designed for operation in a semi-upright solar facing position. Device 100 includes transparent panel 1 which is glass or plastic of nominal thickness through which solar radiation can readily pass into the water and steam chamber 2 of the solar facing or front wall of which is formed by the inner surface of the transparent panel. Opaque panel 3 has a black painted inner surface which forms the rear wall of the chamber.

Spacing between the transparent and the opaque panel is maintained by grid 4 which for the purpose of demonstration is described as having the appearance of diagonally applied $\frac{1}{2}''$ hardware cloth but in actuality being different from this well known material in that strands 5 and 6 of grid 4 are not woven under and over each other. All the grid strands that extend in the same direction are in the same plane. That is, strands 5 which extend upward from left to right diagonally are all in a common plane which communicates with the inner surface of the opaque panel while strands 6 which extend upward from right to left diagonally are all in a common plane which communicates with the inner surface of the transparent panel. Spacing between the panels is maintained by the thickness of crossover points 7 which for example would provide a $\frac{1}{4}''$ space between the panels if the strands were all $\frac{1}{8}''$ in diameter.

Figure 3:
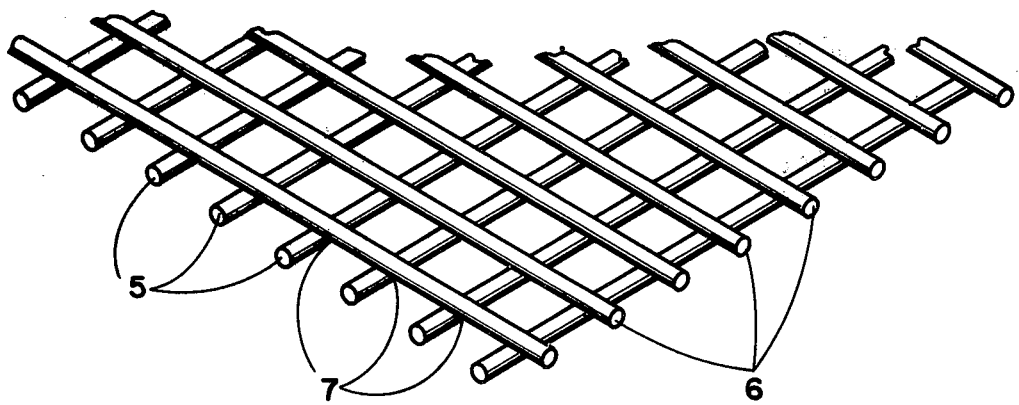
FIG. 3 is a fragmented enlarged view of one element forming part of this invention.
Figure 4:
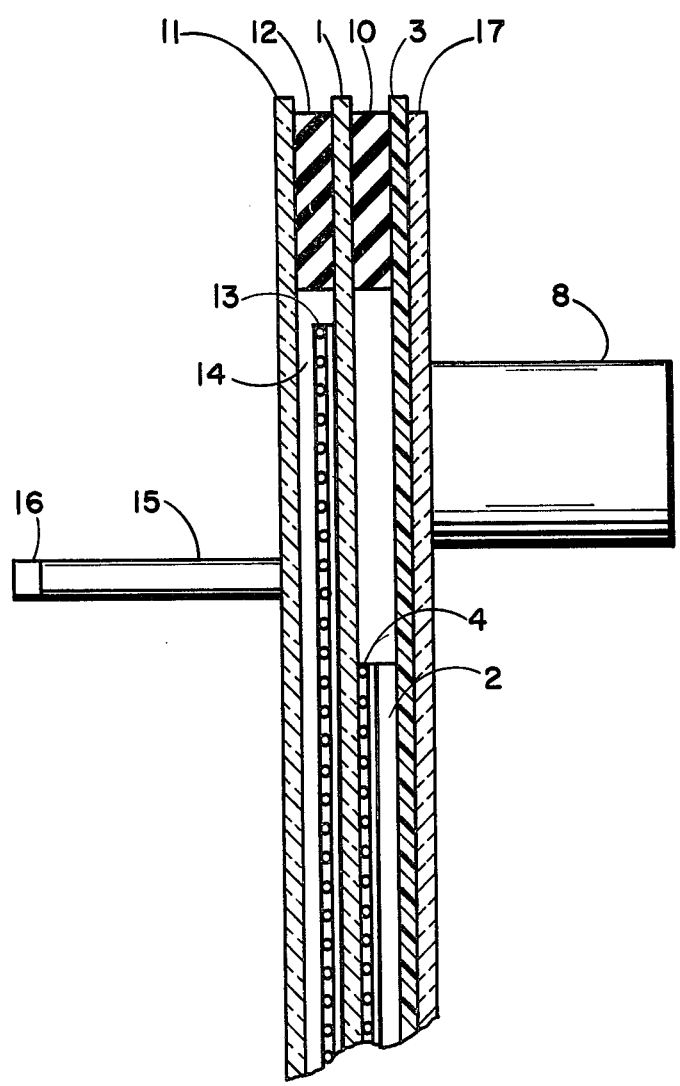
FIG. 4 is a fragmented end view of a second embodiment of the invention.

The grid design being described is in essence a moulded plastic screen in which the strands are welded together at each of their cross over points 7 as shown in FIG. 3. Other designs for grid 4 are possible and any which are in keeping with the spirit of this invention are considered to be within its purview.

Except for the steam outlet 8 and the condensate inlet 9 comprising plastic or metal conduit fittings sealed to properly sized openings either in transparent panel 1 or opaque panel 3, the water and steam chamber 2 is hermetically sealed by gasket forming cement 10 placed in liquid form between the panels around the entire outside edges of the assembly and left to cure to a semi firm rubber like seal. Atmospheric pressure from outside the assembly is always greater than pressure inside the chamber and therefore serves as the primary means for keeping the panels securely pressed toward each other against the grid and the gasket forming material to prevent leakage. The chamber boundaries are defined by the inner surfaces of the gasket 10 and the inner surfaces of the transparent and opaque panels.

The grid design given here provides more or less separate pathways for the flow of steam as opposed to the flow of condensate water within the chamber. Generally, during normal operation, condensate water being returned from heating equipment served by the subject invention is in communication with all parts of the inner surface of transparent panel 1 except at those points where the condensate is being temporarily displaced by steam bubbles created by solar radiation. Condensate enters the chamber through inlet 9 and then flows downward within the chamber across the panel diagonally from the right hand side of the grid toward the bottom guided by grid strands 5 which are disposed to that purpose. Regardless of fresh steam bubbles which tend to occupy the same immediate area, the condensate stays in contact with the inner surface of the opaque panel until it is transformed into steam because the panel operates in an inclined position with subjects the condensate to gravitational pull in a rearward as well as downward direction.

Solar radiation having passed through the transparent panel and the condensate water falls upon the blackened surface of opaque panel 3 causing a surface phenomena which increases the internal energy of the water in direct proportion to the amount of radiation involved. The result is that some of the condensate water changes to steam. A beneficial circumstance is that the temperature at which this change of state takes place can be at any level between 32° F. and 212° F. depending on the degree of vacuum existing within the system as a whole at the time of the change thus making possible the capture of solar radiation in live steam at any temperature between the freezing and boiling point of the condensate water.

In order to bring about a drop in the internal pressure in the chamber, such that the change of state transformation of water to steam can take place within the chamber, a suitable vacuum pump is attached in conventional matter to a steam line attached to the outlet means.

In changing state, minute bubbles of water vapor form in the small frames of grid 4 and lodge toward the inner surface of transparent panel 1 where they increase in size as more water is vaporized in their immediate vicinity. As each bubble grows sufficiently in size to become completely buoyant, it ascends diagonally across the inner face of the transparent panel toward the left side and upward along the left side of the chamber and through the steam outlet 8. In practice, many steam bubbles are being formed at the same time and the flow pattern is evident and vigorous.

In colder climates, double glazing consisting of optional transparent panel 11 sealed to the outside of transparent panel 1 with additional gasket material 12 and having a dead air space 14 between is recommended. The dead air space is capable of transmitting atmospheric air pressure through itself onto the face of transparent panel 1 to assure proper sealing of water-steam chamber 2.

In extremely cold climates, optional grid 13 is included between optional transparent panel 11 and transparent panel 1 before they are sealed in order to make possible a complete evacuation of space 14. Process fitting 15 comprising a plastic or metal conduit sealed to an appropriate opening in optional transparent panel 11 is used for temporary attachment of evacuating equipment then sealed with gasket forming material 16.

Figure 5:
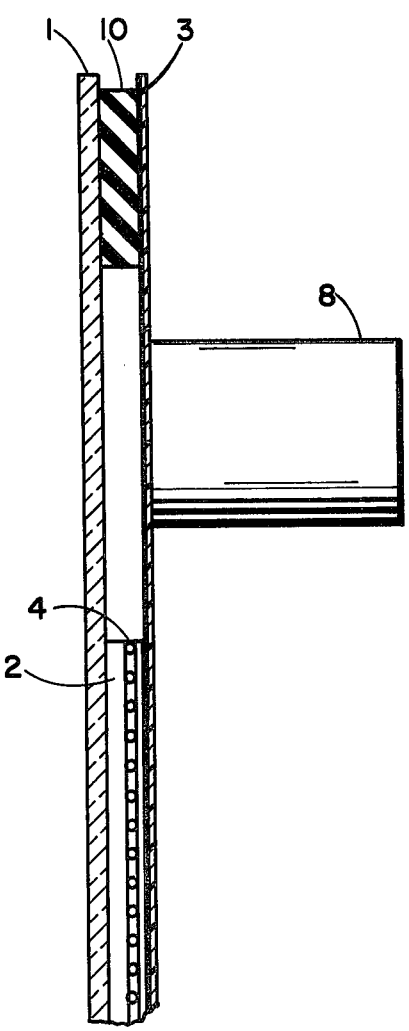
FIG. 5 is an end view of another embodiment of this invention, which embodiment is configured for passing some of the solar radiation collected by the panel into an attic room or other adjacent space intended to be heated.

Corkboard, asphalt paper, or other appropriate insulating material 17 may be factory or field installed between the outside surface of opaque panel 3 and the roof or other structure upon which the assemblies are to be mounted except in cases where heat losses by conduction from the opaque panel may be beneficial to the building intended to be heated as shown in FIG. 5. In these cases, opaque panel 3 is specified to be of heat conductive material and insulation material 17 is to be deleted.

Figure 6:
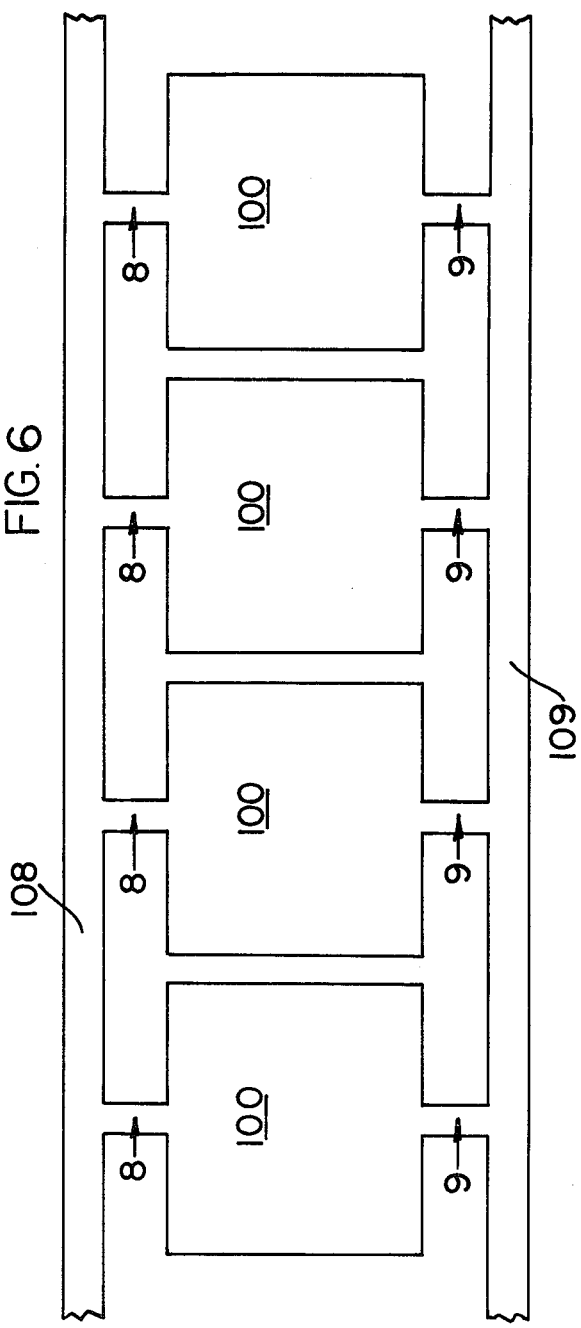
FIG. 6 is a schematic drawing which illustrates the interconnection of a plurality of the devices of this invention wherein the inlet and outlet means of each of said devices is connected to a common line.

FIG. 6 depicts a plurality, here 4, of the assemblies of this invention wherein each outlet 8 is connected to a common steam header 108, and each inlet 9 is connected to a common condensate return line 109. The connections of the steam header 108 and the condensate return line 109 to other extraneous equipment, is known and well understood by heating, air conditioning and solar technology personnel.

Figure 7:
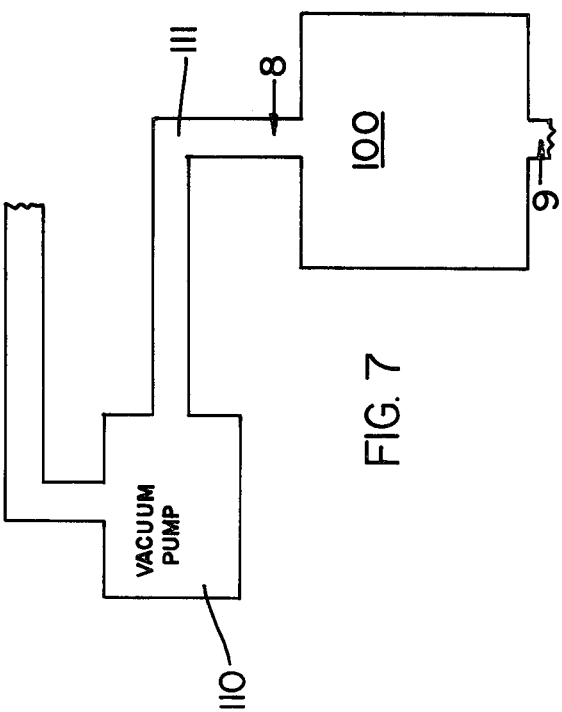
FIG. 7 is a schematic drawing illustrating the interconnection of a vacuum pump to the outlet of the device of FIG. 1.

FIG. 7 schematically illustrates the attachment of a vacuum pump 110 to the outlet 8 of one of the devices of this invention 100 by way of line 111, whereby the device will have its internal pressure reduced by the action of the pump within device 100.

Since certain changes may be made in the above apparatus without departing from the scope of the invention herein involved, it is intended that all matter contained in the above description and shown in the accompanying drawings shall be interpreted as illustrative and not in a limiting sense.

What is claimed as new is as follows:

1. A laminated panel assembly comprising a rigid transparent panel, a rigid opaque panel spaced apart therefrom, and a sealing means securing the transparent panel to the opaque panel to define a chamber for containing water and steam at various pressures in which the water can change to steam under the influence of solar radiation and having a grid for a spacing means between the panels, said grid comprising a plurality of spaced apart parallel members secured to a plurality of spaced apart parallel members secured normal thereto, all the members in one direction being in the same plane, and inlet and outlet means for the introduction of liquid into and the removal of gas from said chamber, said means being in fluid communication with said chamber.

2. The assembly described in claim 1 wherein the inner surface of the opaque panel is colored black.

3. The assembly described in claim 1 having in addition thereto a second transparent panel sealed to the outside of the first transparent panel with a dead air space there between to retard undesirable conduction and convection heat flows.

4. The assembly of claim 1 further including insulation on the rearside of the opaque panel.

5. The assembly of claim 1 having the opaque panel described therein made of material which has high thermal conductivity.

6. The assembly described in claim 1 in which the water can change to steam in response to reductions of pressure within the chamber, in combination with vacuum pumping means attached to the outlet means.

7. A plurality of the assemblies described in claim 1 arranged in batteries or groups, each of such assemblies having an outlet means and a condensate inlet and having the outlet of each assembly connected to a common steam header and inlet of each assembly connected to a common condensate return line.

8. The assembly of claim 1 wherein the outlet means is located at the top of the assembly.

* * * * *